United States Patent [19]

Powell

[11] Patent Number: 5,269,234
[45] Date of Patent: Dec. 14, 1993

[54] METHOD FOR PROCESSING SOLID, HAZARDOUS WASTE MATERIAL FOR USE AS A FUEL

[75] Inventor: Ronald D. Powell, Hannibal, Mo.

[73] Assignee: Continental Cement Company, Hannibal, Mo.

[21] Appl. No.: 963,673

[22] Filed: Oct. 20, 1992

[51] Int. Cl.⁵ .............................................. F23G 5/033
[52] U.S. Cl. .................... 110/246; 110/222; 241/21; 241/DIG. 38; 44/311
[58] Field of Search ....................... 110/222, 223, 246; 432/105; 44/300, 311, 628; 241/21, DIG. 38

[56] References Cited

U.S. PATENT DOCUMENTS

| | | | |
|---|---|---|---|
| 1,647,471 | 11/1927 | Plauson et al. | 241/21 X |
| 4,008,053 | 2/1977 | Brenneman et al. | 44/311 X |
| 4,022,629 | 5/1977 | Garrett et al. | 106/100 |
| 4,063,903 | 12/1977 | Beningson et al. | 44/2 |
| 4,113,185 | 9/1978 | Marsh et al. | 241/DIG. 38 |
| 4,138,226 | 2/1979 | Verschuur | 44/51 |
| 4,244,700 | 1/1981 | Chukhanov et al. | 44/1 R |
| 4,298,349 | 11/1981 | Gabbay | 44/1 C |
| 4,560,391 | 12/1985 | Ashworth | 44/51 |
| 4,579,563 | 4/1986 | Burnside et al. | 44/311 X |
| 4,692,167 | 9/1987 | Levasseur | 44/2 |
| 4,770,352 | 9/1988 | Takamoto et al. | 241/72 |
| 4,850,290 | 7/1989 | Benoit et al. | 110/346 |
| 4,889,695 | 12/1989 | Bush | 423/132 |
| 4,934,931 | 6/1990 | Angelo, II | 432/105 |
| 5,011,089 | 4/1991 | Vock et al. | 241/21 |
| 5,078,593 | 1/1992 | Schreiber, Jr. et al. | 432/103 |
| 5,086,716 | 2/1992 | Lafser, Jr. | 110/345 |
| 5,122,189 | 6/1992 | Garrett et al. | 110/246 X |
| 5,130,092 | 7/1992 | Liu | 241/DIG. 38 |

Primary Examiner—William E. Tapolcai
Attorney, Agent, or Firm—Rogers, Howell & Haferkamp

[57] ABSTRACT

A method for utilizing landfill-prohibited solid hazardous waste material as an energy source in a cement kiln is provided. The method comprises obtaining landfill-prohibited solid hazardous waste materials suitable for use in a cement kiln, combining the solid waste materials with a liquid fuel in a milling apparatus to form a mixture, grinding the mixture in the milling apparatus in a manner reducing the particulate size of the solid hazardous waste material to form a fuel slurry, and delivering the fuel slurry directly into the flame of the cement kiln. The grinding of the solid hazardous waste material in the milling apparatus prior to its introduction into the kiln provides for a rapid and instantaneous ignition of the solid hazardous waste materials thereby not adversely affecting the forming clinker or the operating parameters of the kiln.

9 Claims, 1 Drawing Sheet

METHOD FOR PROCESSING SOLID, HAZARDOUS WASTE MATERIAL FOR USE AS A FUEL

BACKGROUND OF THE INVENTION (1) Field of the Invention

This invention relates, in general, to the use of hazardous waste material as an energy source in a cement kiln and, more particularly, to a method for utilizing solid hazardous waste material which permits the direct introduction of the solid hazardous waste material into the flame of the burning primary fuel in the kiln.

(2) Description of the Related Art

Numerous industries are faced with the challenge of how to properly dispose of waste materials, liquids or solids, that have been classified as "hazardous" because of its flammable or toxic nature. Environmental regulations prohibit the disposal of many hazardous waste materials in landfills. One alternative for the disposal of landfill-prohibited hazardous waste materials involves its incineration in specially equipped incinerators. Although effective, the use of specialized incinerators is costly and such incinerators are of limited availability.

As an alternative to the use of costly specialized incinerators, cement kilns have been designated by regulatory agencies as being suitable for the disposal of certain hazardous wastes. The high operating temperatures, long residence times, and the ability to provide favorable conditions for the chemical combination of inorganic residues of the waste materials into the active components of portland cement, make cement kilns ideal for the disposal of hazardous wastes. Furthermore, the burning of hazardous wastes in a cement kiln is beneficial to the kiln operator in that the hazardous waste material provides a rather inexpensive source of energy for maintaining the high temperature in the kiln which can significantly reduce the operating costs of the kiln.

Cement kiln operators have readily integrated the use of liquid hazardous waste materials into existing kiln operations. The liquid hazardous wastes are introduced into the burning zone of the kiln and are disposed of by incineration while serving as a source of energy for the kiln. Various attempts have also been made to utilize solid hazardous waste materials as a supplemental energy source in a kiln operation by introducing such materials into the burning zone of the kiln. Of course, it is important that the solid hazardous waste being utilized in such a manner also be incinerated in the burning zone according to environmental standards and regulations and not interfere with or adversely effect the formation of the cement clinker.

Some kiln operators have attempted to directly combine solid hazardous waste material with the supply of powdered coal that is used as the primary fuel source in the kiln. This method is not preferred because the solid hazardous waste material can cause the powdered coal to agglomerate into chunks which reduces its efficiency as a fuel source and because this method contaminates the entire coal supply. Furthermore, the introduction of solid hazardous wastes into the flame of the kiln burner in this manner can result in the creation of an undesirable flame length in the kiln which is detrimental to the production of quality cement clinker.

Others have introduced solid hazardous waste material as it is received from the producer directly into the flame of the kiln. In addition to potentially creating an undesirable flame length in the kiln, solid hazardous waste material as received from the producer often includes particles that do not instantaneously ignite when introduced into the burner flame because of the size of the particles. This is disadvantageous in that some of the solid waste material can come in contact with the cement raw materials before the waste materials are fully incinerated which can cause undesirable reducing conditions in the forming clinker. Still others have introduced a blended slurry of solid and liquid hazardous waste directly into the burning zone of the kiln, but also do not reduce the particle size of the solid hazardous waste materials prior to its introduction into the kiln resulting in similar undesirable effects.

Another method utilizing solid hazardous waste materials in cement kilns involves the containerization of the waste material in a sealed drum and subsequent introduction of the entire container into the interior of the kiln. Examples of such methods are disclosed in U.S. Pat. No. 4,850,290 (Benoit et al.) and U.S. Pat. No. 5,086,716 (Lafser). Such methods are costly in that they require the containerization of the solid hazardous waste in suitable containers and modification of the kiln to accommodate the introduction of the containers.

A need exists, therefore, for a method capable of conveniently and efficiently utilizing landfill-prohibited, solid hazardous wastes as an energy source in the operation of cement kilns that avoids the foregoing problems.

SUMMARY OF THE INVENTION

The present invention is directed to a method for utilizing landfill-prohibited solid hazardous waste materials as an energy source in a cement kiln. The method generally comprises obtaining landfill-prohibited solid hazardous waste materials suitable for use in a cement kiln, combining the solid waste materials with a liquid fuel in a milling apparatus to form a mixture, grinding this mixture in the milling apparatus in a manner reducing the particulate size of the solid hazardous waste material to form a fuel slurry, and delivering this fuel slurry directly into the flame of the cement kiln. By this method, landfill-prohibited solid, hazardous waste material is disposed of in an environmentally sound manner while also contributing to the supply of energy necessary to the operation of the kiln. The grinding of the solid hazardous waste materials in the ball mill prior to its introduction into the flame in the kiln provides for a rapid and instantaneous ignition of the solid hazardous waste materials thereby not adversely affecting the forming clinker or creating an environment that produces an undesirable flame length in the kiln.

Among the several advantages found to be achieved by the present invention may be noted the provision of a method that permits the use of landfill-prohibited solid hazardous waste materials as an energy source in a cement kiln without adversely affecting the quality of the cement clinker being produced; the provision of a method that allows the direct introduction of landfill-prohibited solid hazardous waste materials into the flame in the cement kiln without adversely affecting the forming clinker; the provision of a method for utilizing solid hazardous waste materials as an energy source in a cement kiln that requires only minimal modification of the cement kiln to permit introduction of the solid hazardous wastes into the flame of the kiln; the provision of a method for utilizing solid hazardous waste materials while maintaining a desirable flame length in the kiln; the provision of a method that provides for the introduction of solid hazardous waste material into a cement kiln in a pumpable form; and the provision of a method that reduces the particle size of solid hazardous waste materials to improve its usefulness as an energy source suitable for use in a cement kiln by making it more amenable to a rapid and instantaneous burn.

Other and further advantages of this invention will become apparent from the following description of the invention when viewed in light of the accompanying drawing figures and the claims.

DETAILED DESCRIPTION OF THE PREFERRED EMBODIMENTS

In accordance with the present invention, it has been discovered that landfill-prohibited solid hazardous waste material can be utilized as an effective energy source in a cement kiln by directly introducing the solid hazardous waste material into the flame of the kiln when the particulate size of the solid hazardous waste material is reduced prior to its introduction therein. Thus, while previous attempts to utilize this material have been undesirable, it has now been discovered that, surprisingly, by combining landfill-prohibited solid hazardous waste materials with a liquid fuel in a milling apparatus and grinding the mixture to reduce the particulate size of the landfill-prohibited solid hazardous waste material to form a fuel slurry, the solid hazardous waste can be advantageously introduced into the flame of the cement kiln without adversely affecting the formation of the clinker.

Thus, a method for effectively utilizing a landfill-prohibited solid hazardous waste material as an energy source in a cement kiln has been discovered. The method generally comprises obtaining a quantity of a landfill-prohibited solid hazardous waste material suitable for use as an energy source in a cement kiln, combining this waste material with a liquid fuel in a milling apparatus, grinding this mixture in the milling apparatus in a manner reducing the particulate size of the landfill-prohibited solid hazardous waste material to form a fuel slurry and delivering the fuel slurry into the flame of the kiln.

Figure 1:
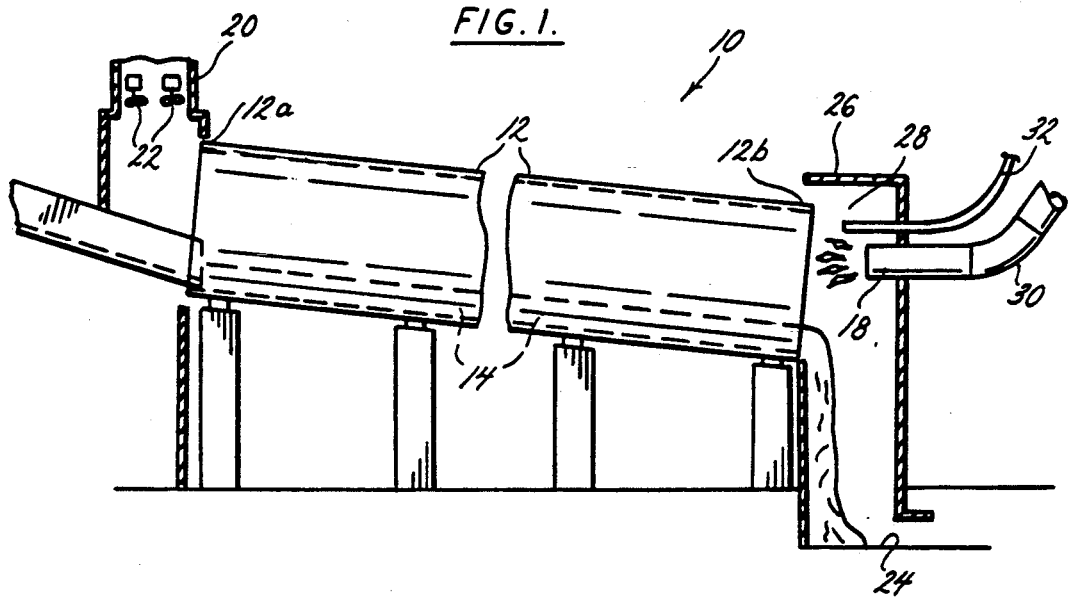
FIG. 1 is a schematic outline of a typical cement kiln.

Referring to FIG. 1, a schematic outline of a typical cement production facility 10 is presented. Such a facility includes an inclined rotary cement kiln 12 having an upper end 12a and a lower end 12b. Kiln 12 is typically a long cylindrical tube adapted for rotation about its longitudinal axis. The raw materials 14 for the production of cement clinker are introduced into the upper end 12a of the kiln from a chute 16 and slowly travel down to the lower end 12b of the kiln as the kiln rotates. The interior of the kiln is heated by a burner 18 which is located at the lower end 12b of the kiln. The gases in the kiln are driven through the kiln from the lower end 12b to the upper end 12a and out the exhaust stack 20 by blowers 22 in the exhaust stack. The gas temperature in the interior of the kiln varies from around 1900° C. at the lower end 12b of the kiln to about 450° C. at the upper end 12a. The temperature in the middle portion of the kiln is typically between about 900° C. and 1200° C. The clinker produced exits the kiln at the lower end 12b and falls onto a cooling grate 24 where it is allowed to cool and then further processed to yield portland cement.

A shield 26 is presented near the lower end 12b of the kiln to create a firing chamber 28 where a flame is created to heat the gases flowing through the kiln. Shield 26 presents an opening therethrough for burner 18. The primary fuel to create the flame in firing chamber 28 is supplied by primary fuel pipe 30. Typically, the primary fuel is powdered coal which is stored at a location distant from the kiln and the coal delivered by forced air through pipe 30 to the burner 18 where it is ignited to create the flame in firing chamber 28. In order to accommodate the use of supplemental fuels as an energy source for the flame, a supplemental fuel pipe 32 is presented through an opening in shield 26 extending into the firing chamber 28 and directed into the flame. Although not shown in FIG. 1, a plurality of supplemental fuel pipes may extend into the firing chamber to accommodate the introduction of a plurality of supplemental fuels into the burner flame or into the kiln generally.

According to the method of the present invention, a suitable landfill-prohibited solid hazardous waste material is identified and obtained. Generally, any solid hazardous waste material that cannot be properly disposed of in a landfill and that has an energy value of at least about 5,000 BTU/lb can be utilized as an energy source in a cement kiln. More specifically, the solid hazardous waste materials should have an energy value of greater than 5,000 BTU/lb and contain no PCB's as defined in 40 C.F.R. §761.20(c)(4). Preferably, the solid hazardous waste material contains no more than 3% sulfur, less than 1% total chlorides, less than 25% total water and less than 30% ash content. It is also desirable that the solid hazardous waste material contain minimal amounts of heavy metals. The solid hazardous waste material selected for use in this invention should have no more than 1,000 ppm of antimony, 50 ppm of arsenic, 4,000 ppm of barium, 1.5 ppm of beryllium, 50 ppm cadmium, 2,000 ppm total chromium, 4,000 ppm lead, 10,000 ppm manganese, 2 ppm mercury, 250 ppm silver and 50 ppm thallium. Moreover, the landfill-prohibited solid hazardous waste materials should not contain toxic substances, pesticides or poisons at concentrations which would render it hazardous as defined in 40 C.F.R. §261. It is to be understood that various types of landfill-prohibited solid hazardous waste material can be blended to meet these requirements for the use of solid, hazardous waste material in the method of this invention. That is, material obtained that has higher heavy metal content than permitted can be blended with materials having a lower heavy metal content to yield a waste material that meets the criteria for use in the cement kiln so long as the resulting mixture maintains an energy value of at least 5,000 BTU/lb and contains no PCB's as defined above.

One of the most preferred solid hazardous waste materials that can advantageously be utilized in the method of this invention is oil contaminated soil or oil sludge from petroleum fields. Such hazardous waste material is typically obtained as a slightly tacky, granular substance. Various other solid hazardous waste materials can also be used advantageously in the method of this invention. Waste products from industrial chemical processes such as phthalic anhydride can be used. In particular, hazardous waste materials as defined under EPA Hazardous Waste Codes K048, K052 and U190 are representative of waste materials useful in the method of the present invention. Any landfill-prohibited solid hazardous waste materials to be used in the method of this invention is analyzed prior to use to assure that it meets the applicable environmental requirements for disposal in a cement kiln.

Figure 2:
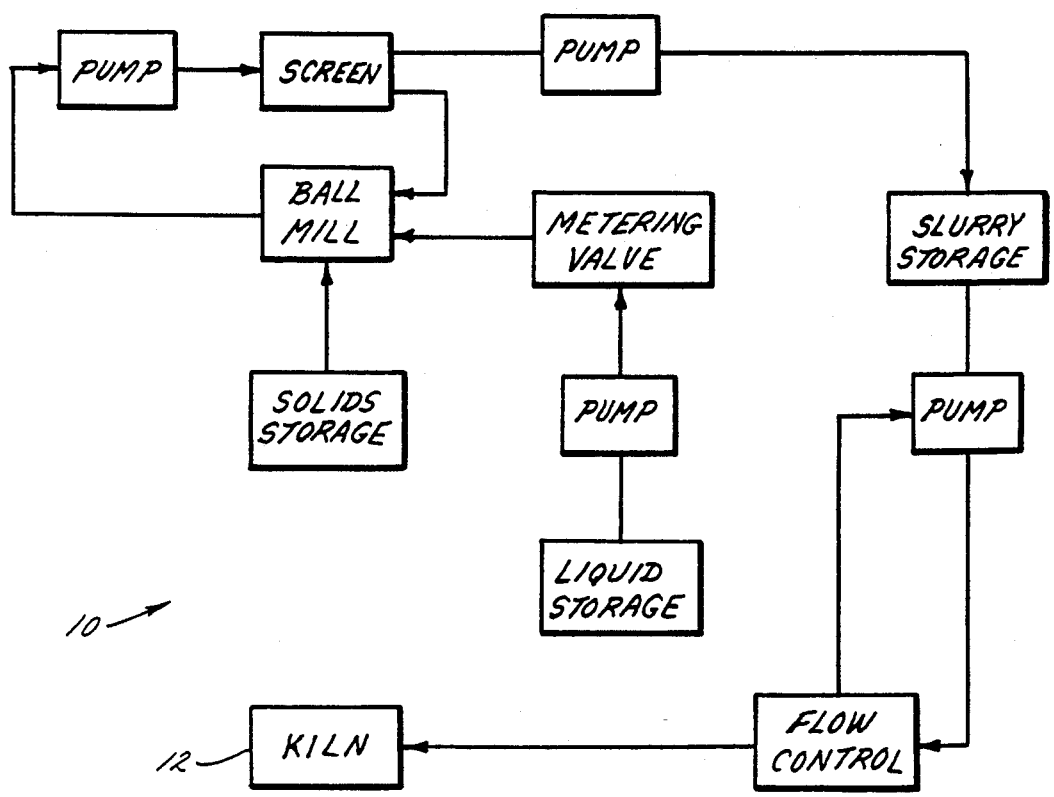
FIG. 2 is a flow diagram representing the process of this invention.

After a suitable solid hazardous waste material is selected, it can be processed according to the method of this invention. Referring to FIG. 2, a process flow chart of the present invention is provided. The landfill-prohibited solid hazardous waste material is conveyed from a storage facility via a belt conveyor or like device to a milling apparatus. Various milling apparatuses are known can be used such as a ball mill, a hammer mill, an attrition mill, etc. In particular, a 7' diameter by 13' long rotating ball mill utilizing variously sized steel grinding media, such as grinding balls, has been advantageously used to reduce the particulate size of solid hazardous waste material according to the method of this invention. To accommodate the hazardous waste material, the ball mill shell is sealed with a material compatible with the introduction of waste materials. The ball charge occupies approximately ⅓ of the capacity of the mill. A single 250 horsepower, 1170 rpm, 4160V, three phase, 60HZ electric motor drives the ball mill. The mill rotates at 20.8 rpm and a variable voltage controller allows the unit to step up to operating speed. The unit is considered a single speed mill.

Prior to the introduction of any materials into the milling apparatus, an analysis is conducted to determine the appropriate blend of solid hazardous waste materials and liquid fuel for optimal burning conditions in the kiln. From this test, a desired feed rate is determined for introduction of the solid hazardous waste materials and liquid fuel into the milling apparatus.

A liquid fuel is initially introduced into the milling apparatus from a storage tank. Referring to FIG. 2, the liquid fuel is pumped into the ball mill via a suitable pipe or other conduit and the amount of liquid fuel introduced is regulated by a metering valve capable of measuring the rate and total amount of liquid fuel delivered into the mill. The flow rate can be controlled to regulate the flow rate of the liquid fuel to match the introduction of solid hazardous waste materials into the mill. It is preferred that the fuel slurry resulting from the combination of liquid fuel and landfill-prohibited solid hazardous waste materials comprise about 30% to about 50% solids.

The liquid fuel can be any fuel that meets the same criteria as that for the use of solid hazardous waste materials in the kiln. Liquid hazardous waste material such as waste paint thinner, contaminated jet fuel, inks, used waste solvents and the like are preferred. Suitable liquid waste fuels can be obtained commercially. Other non-waste fuels such as petroleum based fuels can also be used.

Solid hazardous waste materials are then fed into the ball mill at the desired rate and the ball mill started. As the waste materials are added to the ball mill, the volume in the mill increases until the resulting fuel slurry can exit the discharge of the ball mill unit into the wet well hopper of the recirculation pump. While in the mill, the liquid fuel/solid hazardous waste combination is subjected to the grinding action of the ball mill. The solid materials in the slurry are pulverized during operation of the mill to a fineness that will allow it to pass through a screening device. The resulting fuel slurry containing pulverized landfill-prohibited solid hazardous waste material is pumped to a screening apparatus that permits only appropriately sized solid particles to pass through. Preferably, a 270° DSM stainless steel 100 mesh screen is used. Any oversized materials are returned to the ball mill for additional grinding.

Appropriately sized solid hazardous waste material in the fuel slurry exiting the ball mall passes through the screen and into the wet well hopper of the discharge pump. The discharge pump then transports the fuel slurry to a liquid fuel tank farm for storage until required for use in the kiln. In another embodiment of the invention, the recirculating loop from the screen can be by-passed and the pulverized fuel slurry pumped directly to the liquid fuel tank farm without the intervening screening step.

The resulting landfill-prohibited solid hazardous waste material/liquid fuel slurry provides a fuel slurry that can be used as a supplemental fuel in a cement kiln. Preferably, the resulting slurry contains between 30% and 50% solid hazardous waste material suspended in a liquid waste fuel. The slurry can be stored for over a week without any significant settling of the solids. The particulate size of the solid hazardous waste material has been significantly reduced in size to improve its burnability and usefulness as an energy source for a cement kiln. When delivered into the firing chamber of a cement kiln, the solid hazardous waste material is ignited virtually instantaneously as a result of the increased surface area of the solid hazardous waste material created as a result of the method of this invention. This process enhances the combustibility of the waste material and enables its efficient use as an energy source in a cement kiln without affecting the quality of the cement clinker being formed or adversely affecting the flame length as well as providing an environmentally sound method for disposing of such waste materials. By processing the solid hazardous waste materials in the manner described in this invention, it has been found that the flame in the cement kiln can be maintained between about 30 and about 70 feet closer to the lower end of the kiln.

The fuel slurry produced by the method of this invention can be delivered into the firing chamber of the cement kiln and directly into the flame of the burner by any known or desired means. Typically, the fuel slurry will be pumped via an appropriate pipe into the firing chamber such as shown in FIG. 1. The fuel slurry is considered to be used in addition to other energy sources used in the kiln.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method for utilizing a landfill-prohibited, solid hazardous waste material as an energy source in a cement kiln, the method comprising:

providing a landfill-prohibited, solid hazardous waste material having an inherent energy value sufficient for use as an energy source in the cement kiln and being suitable for disposal in the cement kiln;

combining the landfill-prohibited solid hazardous waste material with a liquid fuel in a milling apparatus to form a mixture;

grinding the mixture in the milling apparatus in a manner reducing the particulate size of the landfill-prohibited, solid hazardous water material to form a fuel slurry; and delivering the fuel slurry directly into the burner flame of the cement kiln for virtually instantaneous ignition and incineration of the solid hazardous waste in the fuel slurry.

2. The method as set forth in claim 1 wherein the landfill-prohibited solid hazardous waste material is an industrial waste product.

3. The method as set forth in claim 1 wherein the landfill-prohibited, solid hazardous waste material has an inherent energy value of at least about 5000 BTU/lb.

4. The method as set forth in claim 3 wherein the landfill-prohibited, solid hazardous waste material contains no greater than 30% water by weight.

5. The method as set forth in claim 1 wherein the landfill-prohibited, solid hazardous waste material is ground to a fineness permitting passage of the solid waste materials in the fuel slurry through a 100 mesh screen.

6. The method as set forth in claim 1 wherein the fuel slurry comprises about 30% to about 50% solids.

7. The method as set forth in claim 1 wherein the landfill-prohibited, solid hazardous waste material is a quantity of an oil sludge or oil contaminated soil.

8. The method as set forth in claim 1 wherein the liquid fuel is a liquid hazardous waste material.

9. The method as set forth in claim 1 wherein the liquid fuel is a petroleum based fuel.

* * * * *